United States Patent [19]

Vom Braucke et al.

[11] Patent Number: 5,299,816
[45] Date of Patent: Apr. 5, 1994

[54] WHEELED PLATFORM CARRIAGE WITH AN UPRIGHT HANDLE

[75] Inventors: Manfred Vom Braucke, Bielefeld; Hans Vom Braucke, Vlotho, both of Fed. Rep. of Germany

[73] Assignee: Bielefelder Küchenmaschinen- und Transportgeräte-Fabrik vom Braucke GmbH, Bielefeld, Fed. Rep. of Germany

[21] Appl. No.: 974,720

[22] Filed: Nov. 12, 1992

[30] Foreign Application Priority Data

Nov. 11, 1991 [DE] Fed. Rep. of Germany ... 9114069[U]

[51] Int. Cl.⁵ .......................... B62B 5/06; B62B 3/02
[52] U.S. Cl. ..................... 280/33.998; 280/655.1; 280/47.34; 280/79.11
[58] Field of Search ............... 280/33.998, 655, 655.1, 280/79.11, 47.34, 47.371, 47.315

[56] References Cited

U.S. PATENT DOCUMENTS

| | | |
|---|---|---|
| 355,192 | 12/1886 | Merrill et al. .................. 280/655.1 |
| 2,472,989 | 6/1949 | Skipper et al. ............... 280/79.11 X |
| 2,754,127 | 7/1956 | Owens, Sr. . |
| 3,394,942 | 7/1968 | Smith et al. .................. 280/79.11 X |
| 3,628,805 | 12/1971 | Archer . |
| 3,698,733 | 10/1972 | Isaacs ............................ 280/33.998 |
| 3,976,309 | 8/1976 | Montanelli ....................... 280/650 X |
| 3,982,768 | 9/1976 | Getman ........................... 280/79.11 |
| 4,274,644 | 6/1981 | Taylor . |
| 4,505,495 | 3/1985 | Foss et al. . |

FOREIGN PATENT DOCUMENTS

| | | | |
|---|---|---|---|
| 233970 | 6/1964 | Austria ........................ 280/33.998 |
| 384640 | 11/1923 | Fed. Rep. of Germany ... 280/79.11 |
| 1954287 | 1/1967 | Fed. Rep. of Germany . |
| 1974440 | 12/1967 | Fed. Rep. of Germany . |
| 6751084 | 1/1969 | Fed. Rep. of Germany . |
| 7418998 | 10/1975 | Fed. Rep. of Germany . |
| 3311973 | 10/1983 | Fed. Rep. of Germany . |
| 279588 | 11/1930 | Italy ............................... 280/47.371 |
| 1497089 | 7/1989 | U.S.S.R. ....................... 280/47.371 |
| 2127357 | 4/1984 | United Kingdom . |

*Primary Examiner*—Brian L. Johnson
*Attorney, Agent, or Firm*—Burns, Doane, Swecker & Mathis

[57] ABSTRACT

A platform carriage comprises a wheeled load-supporting platform having a horizontal surface. A handle is pivoted at a rear end of the platform to be foldable forwardly onto the platform. The handle comprises a pair of rods interconnected by a cross bar. The cross bar is located below the free upper ends of the bars so that the free rod ends form individual hand grips. Each hand grip is inclined forwardly and laterally inwardly. The handle forms a projection which extends upwardly when the handle is folded over, and a carriage can be stacked thereon such that a recessed mating element on the next upper carriage mates with the projection of the next lower carriage to stabilize the stack of carriages.

16 Claims, 4 Drawing Sheets

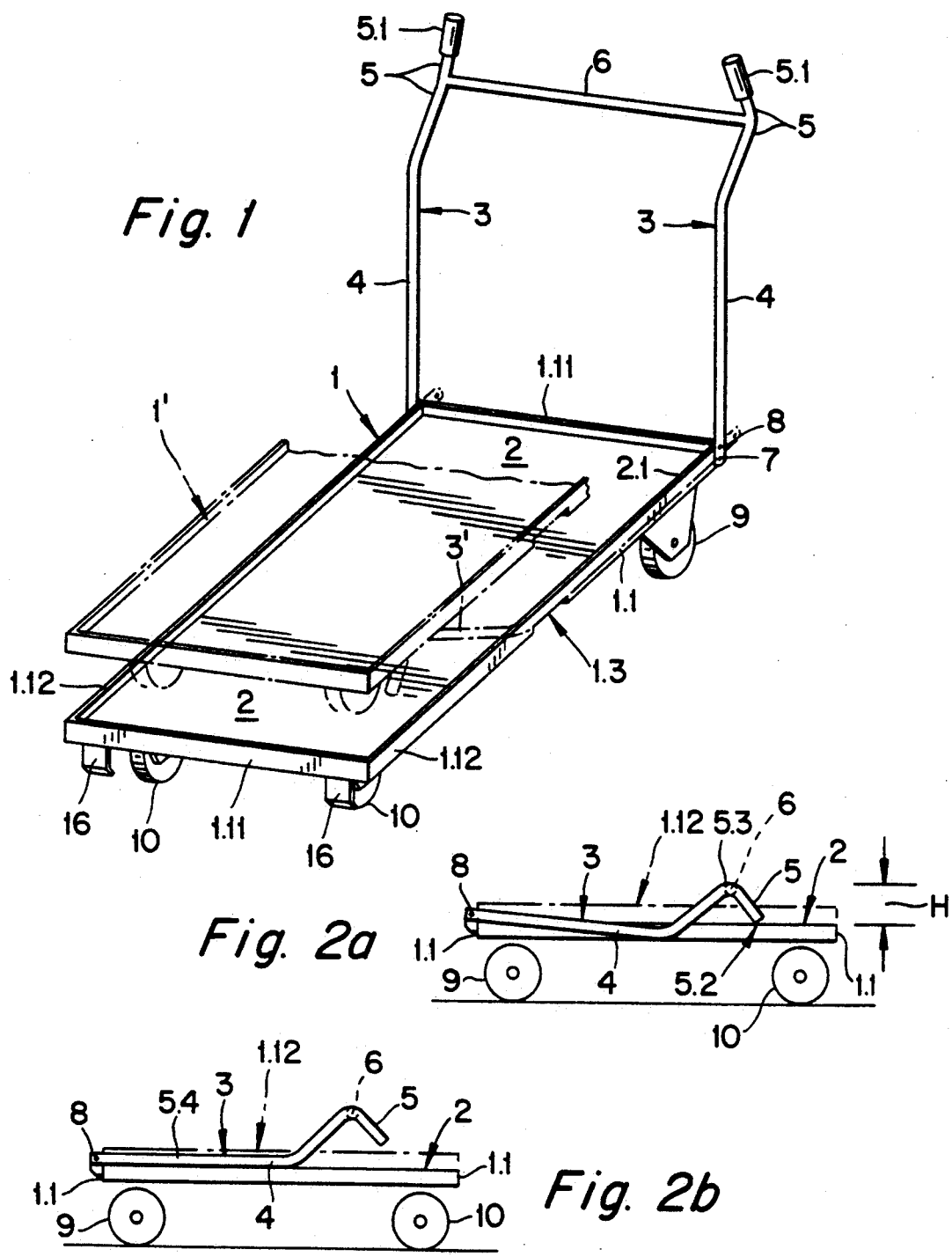
Fig. 1
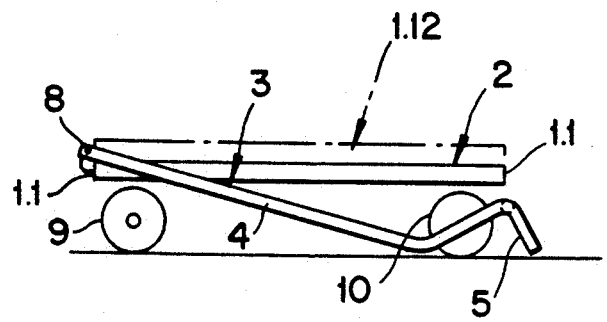
Fig. 2a
Fig. 2b
Fig. 2c

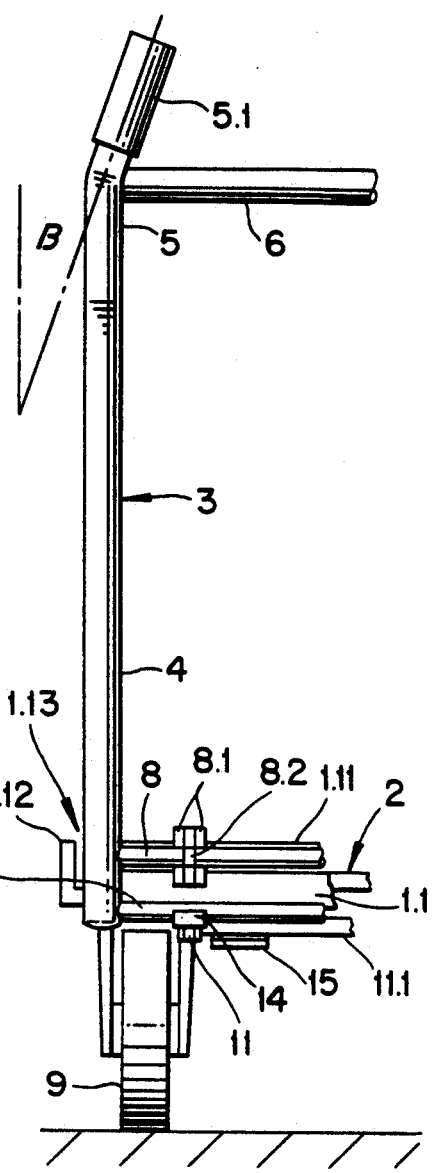
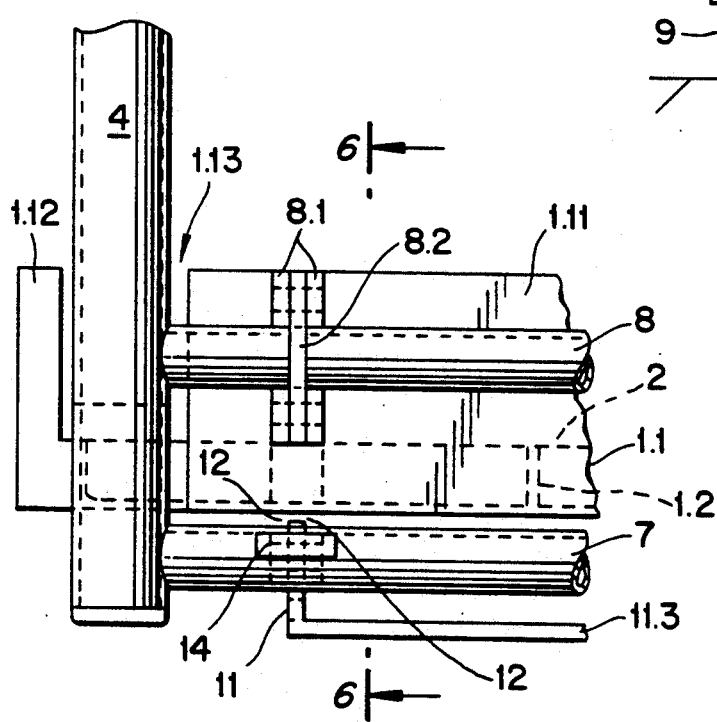
Fig. 4
Fig. 5

WHEELED PLATFORM CARRIAGE WITH AN UPRIGHT HANDLE

BACKGROUND OF THE INVENTION

The invention concerns a platform carriage with a push/steering handle disposed at a rear end of a load supporting platform, and a plurality of stationary rollers, at least one of which being a rotary steering roller.

Platform carriages with push/steering handles are known for example in industrial transport facilities. They comprise a loading platform to carry the load to be transported, under which generally two pairs of wheels or rollers are located. Usually the pair of wheels at the end of the platform located remote from the handle, is formed by stationary jack rollers (i.e., rollers which cannot turn about a vertical axis) and the pair of wheels located adjacent the handle comprise steering wheels which are rotatable about a vertical axis. While in this manner the steering forces may be kept low, the maneuvering ability is severely restricted, a disadvantage that especially in storage facilities designed for space saving with narrow aisles leads to considerable problems. The handle which is used for pushing, pulling and steering and is mounted at one of the two ends of the platform is in the form of a closed sliding grip bow; to move the platform carriage, a force is applied to a horizontal cross bar of the handle, which is not suited to an optimal transmission of such force, especially for steering. Furthermore, no manually correct hand grips can be provided, in particular because the bar forming the sliding grip may be smaller in diameter for static and other reasons than would correspond to an optimal grip diameter; such platform carriages are thus not in keeping with ergometric innovations.

It is the object of the invention to further develop the known state of the art in a manner such that while keeping improved ergometrics in mind, production would be made more economical and applications safer.

SUMMARY OF THE INVENTION

This object is attained according to the invention in that the handle is formed by two upright rods, both terminating in gripping ends connected with each other by means of a transverse cross bar to form a bow or rectangle, wherein the cross bar is located at a distance below the upper free grip ends of the rods, whereby the grip ends provide two upright, essentially straight thrust elements. This configuration creates a handle with individual manual grips that may be moved and steered by the operator. If desired, pushing, pulling, and guiding the platform carriage is also possible by means of the cross bar. The rods may now be arranged in keeping with static conditions, as the grip ends may be provided with gripping sleeves of a diameter favoring manual gripping, that can be installed simply and without difficulty onto the projecting manual grip ends.

In an advantageous manner, the free grip ends of the manual handle are inclined forwardly, with the angle relative to the vertical being from 40° to 50°. This angling provides a position of the gripping ends making possible a favorable and safe transfer of force from the operator. It is also advantageous to incline the grip ends laterally toward each other with the angles being from 15° to 30° relative to the vertical. This incline toward each other moves the hands of the operator laterally inwardly from the collision zone that could result from the collision of two platform carriages. The projecting grip ends are advantageously equipped with preferably plastic sleeves. The sleeves may be formed by selecting the material in a manner such that they make possible safe gripping for example of their surface and their temperature conductivity provides a pleasant feeling. The grips are made of plastic, preferably by injection molding. Advantageously, hands are protected by a shoulder extending from each grip end and constituting approximately an extension of the respective rod, so that the shoulder limits the range of the grip to the outside. It is further proposed that the shoulder forming the hand protection be supported against the manual handle at the end of the rod, so that a closed bow is created. In this manner the hands of the operator on the grips may be protected against dangerous collisions which frequently occur in the manipulation of such platform carriages.

In a form of embodiment in which the handle is removable, the rods of the handle have plug-in ends that may be inserted into sockets provided in the loading platform and fastened therein. It is further proposed to releasably fasten the plug-in ends in the sockets by means of socket pins. Alternatively, the means to releasable securing of the handle may comprise gravity or spring-loaded locks preferably, falling latch-like locking bars. This embodiment is especially suitable for the transport of such platform carriages if stacking at the site of application is not intended.

In another advantageous embodiment both rods are articulated onto the loading platform, with the articulation being equipped with means for the releasable locking of pivoting, wherein the pivoting axle is located at least one-half diameter of the rods above the upper edge of the loading platform. In another variant, the two rods are mounted on the outer sides of the loading platform. With this mounting, the folded-down handle may be pivoted to a position below the plane of the loading platform, so that the height of the platform carriage is reduced, for example for transportation, to the height of the loading platform standing on the rollers. This articulation makes it possible to fold down the handle, and thereby permit the stacking of the platform carriages for example in transportation or storage.

For locking and unlocking, it is proposed to secure the plug-in ends in the sockets releasably by socket pins; alternatively, as the means for the releasable fastening of the handle, spring and/or gravity loaded locks, preferably in the form of falling latch like locking bolts, may be provided. In this manner, the plug-in connection is locked following the insertion and released prior to the removal of the handle; the articulation is locked after erection of the handle for the transmission of force for pushing, and is released for folding down. Fundamentally, a socket pin inserted for locking and removed for releasing is sufficient. Advantageously, however, spring and/or gravity loaded locks are used, of which simple catch connections would be sufficient, but falling latch like locks provide more operating comfort and make possible actuation by foot pedals or manual pulls.

In cooperation with spring and/or gravity loaded locks, it is proposed that at least one of the handle rods have at its end near the articulation and extending past it, a projecting end cooperating with a latch, preferably equipped with a pedal for locking and releasing. If each rod has such a projecting portion, they should be connected with each other by means of a transverse bar linkage. The latch has means to produce a holding moment directed against release generated by spring and/or gravity. Preferably, the latch is both sides of the platform, with latch portions on both sides being connected with each other by means of a transverse bar linkage, the latch preferably being released or locked by a pedal. As the means for unlocking, advantageously mechanical means are provided which may be actuated directly by the operator with foot pedals or manual pulls.

An advantageous further development is obtained by forming the latch in the form of levers and that the latch and/or the transverse bar linkages have means generating a counter moment effecting automatic locking, wherein in one form of embodiment, the means generating the counter moment are springs. In an alternative embodiment, counterweights are provided, wherein preferably the cross linkage forms the counter weight. This configuration is advantageous in particular in the case of latch portions located on both sides, because those portions are connected by the cross linkage and thus may be released simultaneously by a pedal or a pull and resetting of the released latch may be effected simply by a counter weight which permits the latch in the form of a lever to pivot back into the locked position, after the releasing force has been eliminated.

A further development may be obtained by shaping the ends of the handle rods under the grip ends in the form of a V, so that the two points of the V, connected by a transverse cross bar with each other, are oriented against the direction of thrust. Also, the manual handles pointing in the direction of thrust of the handle rods and angled off by about 40° to 50°, do not project past the plane formed by the rods and the transverse cross bars. Advantageously, the two rods are fastened inside the outer edges of the loading platform. Due to this configuration, the rods are able to fully rest on the loading platform and the angled off grip ends form a V open toward the loading platform. In this embodiment, stacking capability may be obtained simply by mounting at least one angle piece under the loading platform in a manner such that transverse cross bars located between the V-shaped recesses of the rods are held by the angle piece, wherein preferably the length of the angle piece and the distance between the angle pieces correspond to the length of the cross bar between the rods. In this configuration, the cross bar located between the upward directed points of the V of the lower end of the stacked platforms fits into the angle pieces of the one above, so that the platform carriages are secured by this quasi-positive lock. This is also true for lateral movements if the angle pieces correspond to the length of the cross bars, or if in the case of two angle pieces their distance corresponds to the length.

Another mode of securing stacks consists of providing between the rods additional cross bars in a manner such that with the grips of the handle resting on the loading surface of the loading platform, the cross bars correspond to one of the steering rollers removed from the grip and/or of the stationary rollers near the grip. Alternatively, it is proposed to provide a stationary front wall between rods, wherein according to another proposal, troughs and/or recesses are located so that in the case of the grips resting on the loading surface of the loading platform, this transverse cross bar corresponds to one of the steering wheels removed from the grip and/or the stationary rollers near the grips. It is possible with these transverse cross bars to secure a stack if the position of the transverse bars is such that the steering rollers and/or the stationary rollers are located between the transverse bars and are held by them in position. The transverse cross bars in this manner also perform a safety function in actual operation of the platform carriages for the load on the loading surface. The same objective is also obtained by the proposed front wall, which is located between the rods in the plane of the handle, wherein transverse bars, troughs and/or recesses may also be provided to secure the stacked platform carriages, with it being apparent that the position of the trough and/or recesses corresponds to that of the steering rollers and/or the stationary rollers.

In a preferred embodiment, the stationary rollers are located on the handle end of the platform, and as steering rollers, a pair of preferably trailing rollers, is located at the other end. According to a further proposal, the gage of the steering rollers is smaller than that of the stationary rollers, preferably by at least two roller widths. This reduction of the gage width of the steering rollers improves maneuverability by the operators, facilitating the handling of the carriages in storage facilities with narrow aisles. Furthermore, stacking is improved, especially if the steering rollers are "clamped" between the grips. Experience shows that the free space between the ends of the gripping pieces inclined against each other is located so that a reduction of the gage by one roller width on either side is sufficient to secure the steering rollers. It is self-evident that another geometry of the grip ends could require different reductions of the gage width. This configuration makes possible a stationary supporting roller pair in the area of the handle and the pair of steering wheels on the end facing away from the handle, as the steering forces to be applied in this layout to the ergometrically aligned manual handle grips may be introduced without difficulty; even a heavily loaded platform carriage retains, with steering rollers located in front, an advantageous mobility, its maneuverability increases.

In a preferred further development the loading platforms of the platform carriages stacked on each other are provided with gripping recesses on either side of the loading platform approximately in the area of the center of gravity. In order to attain secure seating, the individual loading platforms are equipped with a peripheral edge; gripping recesses may also be provided to hold the wheels. Finally, the fixation of at least one of the pairs of wheels leads to the securing of the stacked platform carriages, with such securing being advantageous for the proper operation of the carriages also.

To secure the load, the loading platform advantageously has a peripheral edge to secure the load against sliding off. This anti-skidding edge may be eliminated if a sliding grip pivoting axle is present on the grip side of the platform carriage, as the pivoting axle located above the loading plane of the loading platform and extending over the width of the loading platform, then latter takes over the function of the anti-slide edge. To secure the load, it is advantageous according to another proposal to equip the surface of the loading platform with a non-sliding structure. This configuration is readily attained in a simple manner if the loading platform is a plastic molding. The plastic molding may then easily be provided with the recesses to facilitate stacking and the receivers for the wheel mounts and/or for the articulation or insertion of the handles may also be molded on, preferably injection molded. The supporting roller holders may advantageously be injection molded on, while recesses are provided for the mounting of the steering rollers, for the seating and insertion of the upper track of the steering rollers.

To be able to store away the platform carriage in a simple and space saving manner, the front support of the loading platform is equipped with downward directed erecting noses, which are located at least on either side symmetrically relative to the longitudinal center axis. These erecting noses make it possible to set up the carriage vertically for example, directly at the working site so that it not needlessly occupy space required for movement on the site or for general traffic. These noses are advantageously located in front of the forward steering rollers and thus also protect the rollers. The symmetry relative to the longitudinal center axis does not exclude the feasibility of providing a continuous erecting plate. A slight bevel is provided at the free end of the erecting noses or erecting plate to simplify the tilting of the platform carriage during erection. The beveling angle is small, it is within 5° to 15°.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 1 is a schematic perspective view of a platform carriage (with stacking indicated in broken lines);

FIGS. 2a-2c are schematic side elevational views depicting alternative arrangements of the sliding grip, wherein FIG. 2a shows handle rods located outside of the planes of the carriage side edges, with grip ends of the rods resting on the platform, FIG. 2b shows the rods located inside of the planes of the carriage side edges, and resting on the loading platform, and FIG. 2c shows handle rods located on the outside of the planes of the carriage side edges and overlapping the loading platform;

FIG. 4 is a fragmentary elevational rear view of the platform carriage showing a locking mechanism for the handle, the rods being located inside of the planes of the side edges of the carriage;

FIG. 5 is an enlarged view of a fragment of FIG. 4;

DETAILED DESCRIPTION OF A PREFERRED EMBODIMENT OF THE INVENTION

Figure 3:
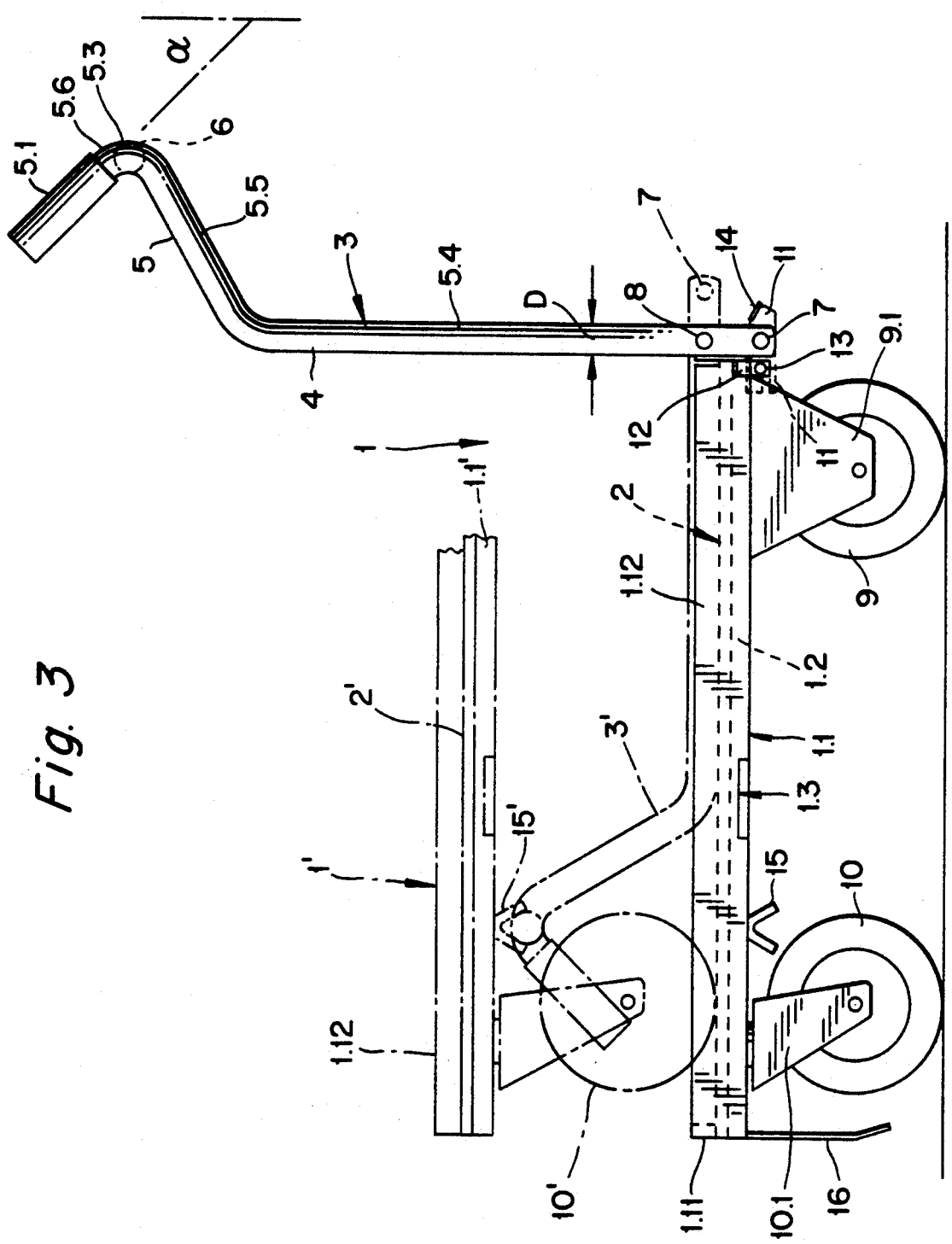
FIG. 3 is a side elevation of the platform carriage (with stacking indicated in broken lines)

FIG. 1 shows schematically a perspective of a platform carriage 1 with a loading platform 2. The loading platform 2 is set into a rigid frame 1.1 of the carriage 1 which includes upstanding longitudinal ribs 1.2, upstanding transverse end edge walls 1.11 and longitudinal side edge walls 1.12. Located on the front side is a push/steering handle having upper grip ends 5 with sleeves 5.1. The handle 3, as indicated by the broken lines, may be folded over onto the platform. The frame 1.2 also serves to hold mounts 9.1 for the jack rollers 9 and mounts 10.1 of steering rollers 10. Retainers for the mounts may be integrally molded with the frame, e.g., of plastic material. It is advantageous to locate the external edges of the rollers 9, 10 within the planes defined by the grip ends 5 of the handle 3. The steering rollers are advantageously mounted with a gage width reduced by one or two roller widths, so that the steering rollers 10 are offset inwardly relative to the jack rollers. This roller configuration facilitates the stacking (indicated by broken lines) of a plurality of platform carriages 1,1'.

The frame and platform together define a load supporting structure. The peripheral walls 1.11 and/or 1.12 could be formed on the platform 2 instead of on the frame.

The three FIGS. 2a-2c show three embodiments of platform carriages 1, having stationary rollers 9 and steering rollers 10, wherein the handles 3 are articulated differently to the loading platform 2. The articulation plane of the handle 3 in FIG. 2a is on the outside of the carriage, as in FIG. 1. If the handle 3 is folded over, it comes to rest with the tips 5.2 of its inwardly angled grip ends 5 seated on the loading platform, while the height H of points 5.3 or vertexes of the grip ends 5 (i.e., the points to which a transverse bar 6 is connected) determines the gage width of the platform carriage to be stacked, i.e., the spacing between stacked carriages.

FIG. 2b shows the articulation plane lying within the sides of the loading platform 2. Here, the long portions 5.4 of the grip 3 rest on the loading platform. The tips 5.2 would rest on the loading platform only if the portions 5.5, 5.6 of the grip ends 5 form an isosceles triangle.

FIG. 2c shows a variant of the outside articulation according to FIG. 2a, however, here the length of the handle 3 is such that the transverse bar 6 passes over the leading end of the loading platform 2 when the handle 3 is folded down, so that the handle is located on the erection plane of the roller pairs, for example for transportation.

FIGS. 3 and 4 show, partially in broken view, a front (FIG. 4) and a lateral (FIG. 3) elevation of the platform carriage 1. The handle 3 is located at the trailing or rear end of the platform carriage 1 where the jack rollers are disposed. This handle 3 is formed by two connecting rods 4, the grip ends 5 of which include the portions 5.5 that are angled rearwardly away from the direction of thrust, and the portions 5.6 which are angled forwardly in the thrust direction T. The portions 5.6 form an angle a relative to vertical which is in the range of 40° to 50°. This angle is ergometrically advantageous for the introduction of a thrust force through the manual handles 5.1. Therefore, the steering rollers 10 are disposed in a leading (forward) position, which provides the platform carriage 1 with very good maneuverability. The grip end 5 of the connecting rod 4 is equipped with comfortable pleasant grip sleeve 5.1 so that for the user a solid grip is provided for the transmission of force. The diameter of the connecting rods need only be dimensioned so as to be strong enough for the transmission of force and is of a diameter for being comfortably gripped. The two upright connecting rods 4 are interconnected by the transverse bar 6 at a location below the tips or free ends 5.2, so that the upper end portions of the two connecting rods 4 together with the transverse bar 6 form the handle 3 comprising upward and forward directed manual grip ends 5.1. These manual grip ends 5.1 are used for the usual push/pull movements, but the transverse bar 6 being in particular available for steering and maneuvering.

The handle 3 is articulated onto the frame 1.1 of the platform carriage 1 by a transverse grip axle 8 which is spaced by a distance of at least one half of a diameter D of the rod 4 above the support plane P of the loading platform 2. The articulation planes of the connecting rods 4 lie inside of the side anti-slide walls 1.12. The handle 3 may therefore be folded over so that the longest portion 5.4 thereof is resting fully on the loading platform 2, independently of the angled grip ends, which makes it clear why the portion 5.5 is inclined away from the forward thrust direction, i.e., this makes possible the above-mentioned full support along at least the long part 5.4 of the connecting rods 4.

The transverse anti-slide wall 1.11 is interrupted at 1.13 (see FIG. 5) within the plane of the connecting rods 4. If desired, the entire transverse wall 1.11 at the rear end of the carriage could be omitted, since a continuous rotary axle 8 is able to perform the function of the wall 1.11 in this area.

The rotary axle 8 is mounted in pairs of brackets 8.1 (see FIG. 6), each pair being located adjacent a respective side of the carriage. A plate 8.2 is connected to the brackets 8.1 by pins 8.3 to retain the rotary axle in the brackets.

Figure 6:
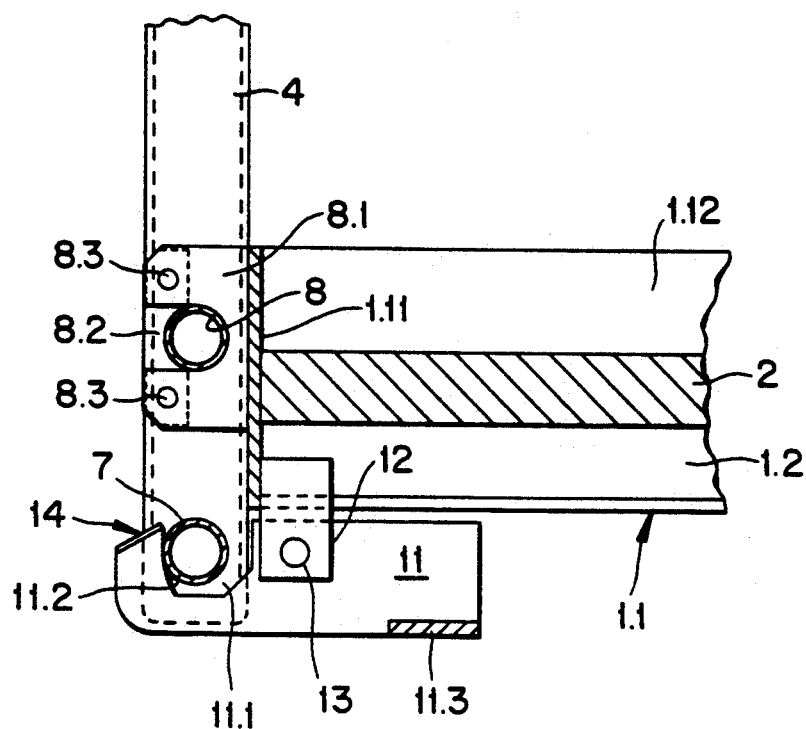
FIG. 6 is a sectional view taken along the line 6—6 in FIG. 5.

To retain the erected handle 3, a locking device shown in detail in FIGS. 5 and 6 includes a pawl 11 pivoting about an axle 13 in a bearing 12 fastened to the frame 1.1. The pawl 11 is provided with a socket 11.1 to receive a locking rod 7 joining the two connecting rods 4 together at their ends opposite the grip ends 5. The locking rod 7 engages the socket 11.1 and is held positively and frictionally during pushing by the force transmitted by the pushing of the platform carriage 1. That is, during pushing of the carriage, the ends of the locking rods 7 are supported against a rear side surface 11.2 of the socket 11.1 and apply a force moment to that rear side surface. The rear side surface 11.2 has a configuration such that the locking rod 7 is held more securely as strong forces are transmitted. The rear side surface 11.2 has a bevel or rounding as viewed in FIG. 6, with the radius of the rounding preferably being about 4 times of the radius of the locking rod 7. The pawl can be rotated about the axle 13 by stepping on a pedal portion 14 of the pawl, but is limited in its deflection by the bottom side of the loading platform 2. As the pawl rotates upwardly, it passes between two adjacent ribs 1.2. The free end of the pawl is preferably equipped with a counter weight or a spring for resetting, i.e., for biasing the pawl to the locking position. Advantageously, two pawls 11 are provided, connected with each other by a transverse bar linkage 11.3 acting as the counter weight, so that a bow-like connection is created, wherein the individual pawl or the pair of pawls are released by the actuation of a pedal 14. If a restoring spring is used, it could be attached between the frame and the pawl.

Figure 7:
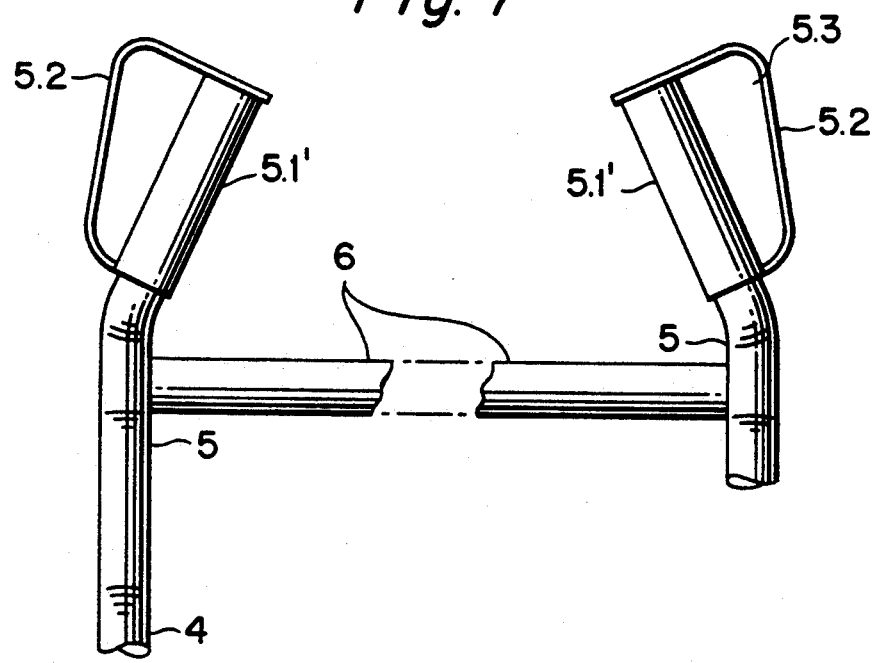
FIG. 7 is an upper fragmentary view of an alternative embodiment of a handle.

Finally, FIG. 7 shows an advantageous configuration of the handle sleeve 5.1'. Here, a hand protection piece 5.2 is provided, whereby a closed bow is formed that surrounds a recess 5.3. The hand protection piece 5.2 constitutes an approximate extension of the connecting rod 4. The entire manual grip end of each rod 4 is therefore located inside of the side boundaries of the platform carriage 1, so that no parts thereof project laterally outwardly in such a manner as to present a risk of injury to the user's hands.

The configuration proposed makes it possible to stack the platform carriages 1 with an upper carriage 1' in FIGS. 1, 3 and 4. After folding down the handle 3, the wheel pairs of the next upper carriage can be placed on the top side of the lower platform. Thus, the shorter wheel base of the steering rollers 10 is advantageous, because during stacking, the projection formed by the portions 5.5 and 5.6 of the rods are able to receive the steering rollers between them. The steering rollers are thereby aligned and in case of a roller spacing which is close to the spacing between the projections, the rollers 10 can be secured by the latter. The angular gripping pieces are helpful in such stacks of a plurality of platforms 1, 1', in stabilizing the stacks.

To facilitate the stacking procedure gripping troughs are provided, for example in the form of recesses 1.3, in the bottom sides of the loading platforms 2 of the platform carriages 1, 1', the recesses being arranged approximately centered in the longitudinal sides, so that with the handle 3 folded down, the weight at both ends of the troughs is about the same and the platform carriage 1 is balanced (or nearly balanced) when manually lifted.

In order to hold the stacked platform carriages 1, 1' safely, an angular piece 15 is mounted on the bottom side of the loading platform (or the platform could be integrally formed with a corresponding angular profile). The piece 15 forms a downwardly open recess which overlaps the transverse bar 6 of the folded down handle 3 of the next bottom carriage, whereby stacked platform carriages 1, 1' are secured in a manner such that the stack is stable.

A space saving feature for storage purposes, is provided by means of erecting noses 16; these are advantageous if there is a shortage of space. In such a case, the transport carriage 1 may be set vertically on the noses 16, so that with the handles folded down, the carriage occupies little storage space. The erecting noses 16 may be located in front of the forward steering rollers so that they also protect the rollers. Although these noses are provided on both sides of the carriage, there could instead be provided a continuous erecting plate. It is advantageous to slightly angle the free end of the erecting noses (or the continuous erecting plate) in the direction of the rollers. The transport carriage 1 is then easier to move when being erected.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A platform carriage comprising:
    a load supporting means including a horizontal platform surface;
    a plurality of support rollers attached to and projecting downwardly from said load supporting means, at least one of said rollers being rotatable about a vertical axis to constitute a steering roller;
    a push/steering handle mounted at a rear end of said load supporting means for rotation about a horizontal axis located adjacent a lower end of said handle to enable said handle to be folded over onto said load supporting means, said push/steering handle comprising a pair of upright rods interconnected by a cross bar located below top free ends of said rods such that upper portions of said rods disposed above said cross bar form individual hand grips, each of said hand grips being inclined forwardly at a first acute angle relative to vertical and being inclined laterally toward the other hand grip at a second acute angle relative to vertical; and
    releasable locking means for locking said handle against rotation about said axis, said locking means comprising a latch disposed below said axis.

2. Apparatus according to claim 1, wherein said acute angle is from about 40 to about 50 degrees.

3. Apparatus according to claim 1, wherein said second acute angle is from about 15 to 30 degrees.

4. Apparatus according to claim 1, wherein each of said rods includes a rearwardly inclined portion and a forwardly inclined portion extending from an upper end of said rearwardly inclined portion, said forwardly inclined portion defining said hand grip and forming an acute angle relative to vertical.

5. Apparatus according to claim 4, wherein said cross bar is connected to each rod at the point of intersection of said rearwardly and forwardly inclined portions.

6. Apparatus according to claim 1, wherein said latch is connected to a foot plate which can be moved from a handle-locking position to a handle-releasing position by downward pressure from an operator's foot.

7. Apparatus according to claim 1, wherein said handle includes a first horizontal cross-bar coinciding with said horizontal axis and defining a pivot axle for said handle, said handle including a second cross-bar extending parallel to said first cross bar and being locked by said locking means, each of said rods of said handle being connected to both of said cross bars.

8. Apparatus according to claim 1, wherein said latch includes biasing means biasing said latch to said locking position.

9. Apparatus according to claim 8, wherein said biasing means includes a counterweight.

10. Apparatus according to claim 1, wherein said handle includes a projection connected thereto and extending upwardly when said handle is in a folded-over position, said projection arranged to be engaged by another carriage stacked thereabove.

11. Apparatus according to claim 10, wherein said loading supporting means includes a downwardly open recess on an underside thereof for receiving said projection of a carriage located therebelow for stabilizing a stack of said carriages.

12. Apparatus according to claim 10, wherein each of said rods of said handle includes a first portion inclined rearwardly, a respective one of said upper portions being inclined forwardly at a junction with said first portion, and a cross bar interconnecting said junctions of said two rods, said first and second portions and said cross bar together forming said projection.

13. Apparatus according to claim 10, wherein said cross bar is positioned across said load supporting means when said handle is in a folded over position.

14. Apparatus according to claim 1, wherein said at least one steering roller is located adjacent a front end of said load supporting means.

15. Apparatus according to claim 1, wherein an end of said load supporting means located opposite said handle includes at least one downwardly projecting nose plate at a front end for defining a carriage support surface when said carriage is stood on said end, said nose plate being spaced forwardly of all of said support rollers such that said carriage is supported solely by said nose plate when stood on end.

16. A platform carriage comprising:
load supporting means including a horizontal platform surface and a mating element mounted on an underside of said load supporting means;
support wheels attached to and projecting downwardly from said load supporting means;
a push/steering handle mounted at one end of said load supporting means, said handle being pivotably mounted adjacent a lower end on a horizontal axis to be able to be folded over onto said load supporting means, said handle including a projection connected thereto which extends upwardly when said handle is folded over for mating with said mating element of a carriage stacked thereon, said mating element forming a downwardly open recess for receiving said projection of a carriage stacked therebelow.

* * * * *